Sept. 8, 1953
A. L. DUFOUR
2,651,344
ONION TRIMMING MACHINE
Filed Sept. 7, 1950
2 Sheets-Sheet 1
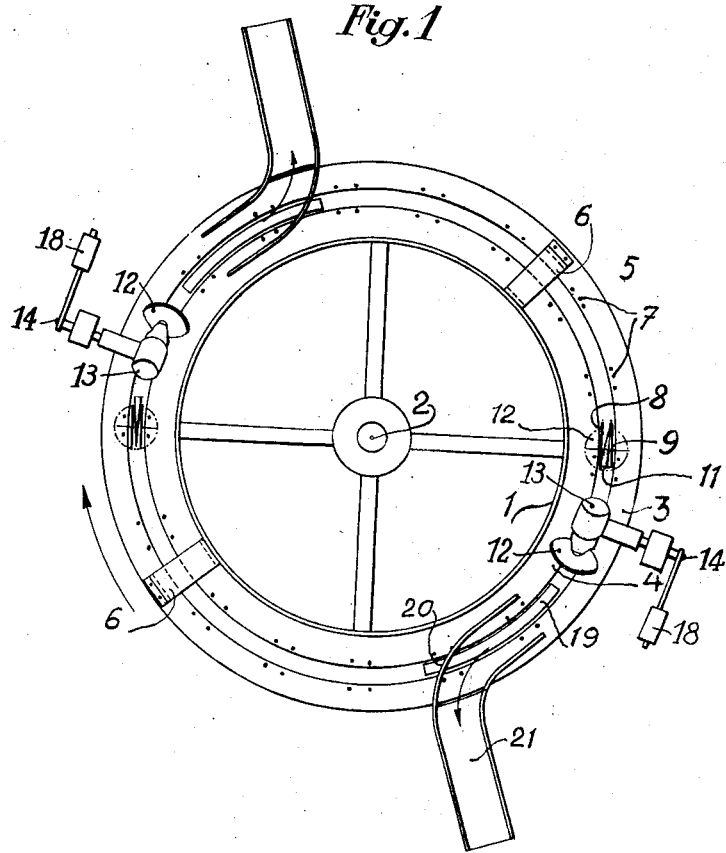
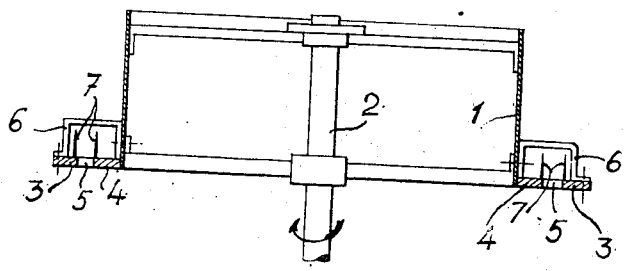
INVENTOR
ADRIEN LUCIEN DUFOUR
BY Haseltine, Lake & Co.
AGENTS Sept. 8, 1953  A. L. DUFOUR  2,651,344
ONION TRIMMING MACHINE
Filed Sept. 7, 1950
2 Sheets-Sheet 2
Fig. 3
Fig. 4
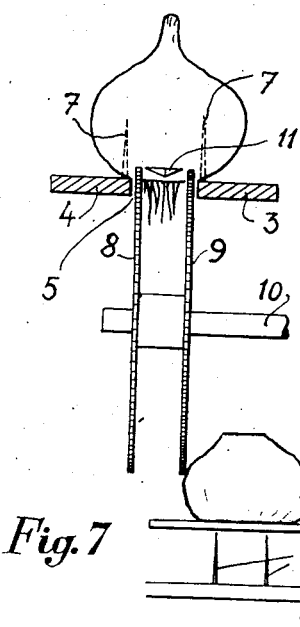
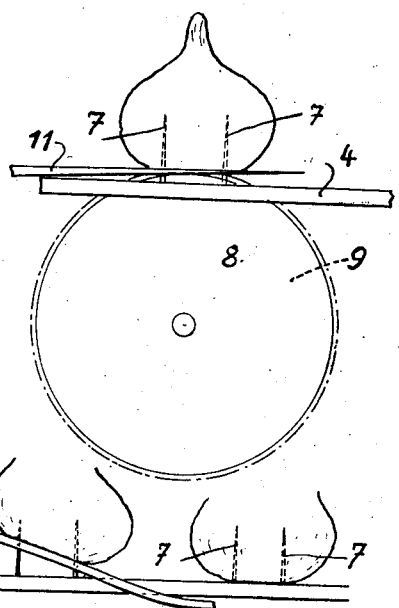
Fig. 7
Fig. 6
Fig. 5
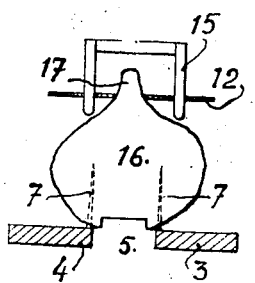
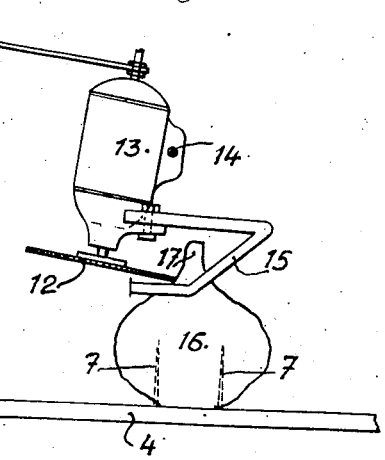
INVENTOR
ADRIEN LUCIEN DUFOUR
By Hoseltine, Lake & Co.
AGENTS Patented Sept. 8, 1953

2,651,344

UNITED STATES PATENT OFFICE 2,651,344

ONION TRIMMING MACHINE

Adrien Lucien Dufour, Dijon, France

Application September 7, 1950, Serial No. 183,546
In France August 30, 1950

4 Claims. (Cl. 146—83)

The present invention has for its object a machine for cutting away onion stalks and roots in order mechanically and efficiently to perform the said operation which is well known is the initial stage in the industrial preparation of edible onions.

The machine according to the invention is comprised primarily of a cylindrical body which is rotatable about a vertical axis. The said body in turn comprises a pair of concentric rims arranged at a distance of a few centimeters from one another and fitted around their adjacent edges with prong sets on which the onions are to be spitted with their roots hanging in the space between said rims and their stalks consequently standing erect.

In the course of the revolution of the cylindrical body the onions spitted on the prongs are moved successively past at least one post which comprises a set of root-cutting tools arranged below the rims, a stalk-cutting tool arranged above the said rims, means to disengage the onions from the prongs and a chute for the discharge of the trimmed onions.

In a preferred embodiment of my invention the set of root-cutting tools consists of a pair of circular saws equal in diameter which are rotatably mounted in the gap between the rims and of a horizontal fixed plane iron or cutter arranged between the pair of saws substantially on a level with the topmost point of the latter.

The stalk-cutting tool consists of a circular saw the driving shaft of which is mounted in a vertically swingable frame; the said frame is balanced with the aid of a counterweight or any like means and is provided with a feeler adapted as the onions are moved past the same to adjust the position of stalk-cutting tool.

The stripping member adapted to disengage the onions from the retaining prongs once they have been trimmed consists of a fixed camming ramp arranged between the rims and adapted to lift the onions clear of the prongs and to shunt them into a discharge chute.

Depending on the capacity and consequently on the size of the machine same may comprise one or several such work posts.

A 2-post machine according to my invention is shown by way of example in the drawing appended hereto.

Figure 1 is a plan view of the rotatable cylindrical body of the machine, the work posts being indicated diagrammatically.

Figure 2 is a vertical section through the axis of the said cylindrical body.

Figure 3 is a sectional view of the set of onion cutting tool set.

Figure 4 is a side elevational view corresponding to Figure 3.

Figure 5 is a side elevational view of the onion stem cutting tool.

Figure 6 is a fractional front elevational view corresponding to Figure 5.

Figure 7 is a side elevational view of the onion disengaging means.

The cylindrical body 1 which, as shown in Figures 1 and 2, is rotatable about a vertical shaft 2 carries a pair of concentric horizontal rims 3, 4, between which a gap 5 is delimited the width of which amounts to a few centimeters; said rims are bridged to one another by means of any suitable number of arch-like members 6, only two of which are shown and so designed that the annular gap 5 remains unobstructed.

Equally spaced sets of four prongs stand on the periphery of the rims on which onions can be spitted erect as shown e. g. in Figure 3.

As shown in Figures 3, 4 and 1, the onion root cut-off means consist of a pair of circular saws 8, 9 equal in diameter, keyed on a common horizontal driving shaft 10 and projecting through the gap 5 between the rims 3 and 4; the said means moreover comprise a stationary plane iron like preferably triangular cutter 11 located between the pair of saws 8, 9 substantially on a level with the top-most point of the same. The said cutter gets into the bottom of the onion a few millimeters above the root tuft while the pair of saws 8, 9 bite into the onion at either side of the tuft which thereby is removed as a whole. The set comprised of a pair of saws 8, 9 and of the cutter 11 is adjustable vertically by any suitable means (not shown).

The onion stalk cut-off member as shown in Figures 5 and 6 consists of a circular saw 12 keyed directly on the shaft of an electric motor 13 the carcase of which is swingably mounted on a horizontal pintle 14 by which it is connected with the machine frame; said carcase carries a bifurcated member 15 to be cammed up and down by the onion as the same is moved therebelow. Depending on the size of the onion that happens to be presented the said onion by meeting the bifurcated follower 15 will tilt the mounting of the saw 12 more or less about the pintle 14 of the same; in this manner the saw 12 will always be set in the position most suitable for the cutting off of the stalk 17. The weight of the saw and its mounting are balanced by a counterweight 18 or by any other suitable means.

As shown in Figure 7, the stripping member which each onion encounters after it has undergone the action of the trimming members consists of a stationary camming ramp 19 located between the rims 3 and 4, by which ramp the onion 16 is cammed upwards clear of the prongs 7. The onion thus disengaged encounters the wall 20 of a chute or runway 21 through which it is taken away.

With the aid of the machine thus described as much as 80% of the labor costs can be saved; on a 2-post machine as described hereinbefore, the operations are completed within one half of a revolution of the machine, so that with a machine manned with two operatives a total of 120 onions per minute can be dealt with.

I claim:

1. An onion-trimming machine comprising a frame, a cylindrical body rotatable about a vertical axis in said frame, a pair of concentric annular rims rigid with said cylindrical body and defining an annular gap therebetween, groups of upwardly projecting prongs on the adjaopposed edges of either rim, each group being adapted to retain an onion spitted thereon with its root tuft hanging through said gap, means for making two spaced vertical parallel cuts in the base of each onion, means for removing the part of the onion between said cuts, means adapted to remove the stalk of each onion as the same is moved around past said stalk-removing means, means to lift each onion vertically clear of the said onion-retaining prongs and means to discharge the onions once trimmed.

2. An onion-trimming machine comprising a frame, a cylindrical body rotatable about a vertical axis in said frame, a pair of concentric annular rims rigid with said cylindrical body and defining an annular gap therebetween, groups of upwardly projecting prongs on the adjacent edges of either rim, each group being adapted to retain an onion spitted thereon by its base, at least one pair of circular saws mounted on a horizontal axis in said gap and at least one and a fixed cutter arranged above the said gap substantially in a horizontal plane tangential to said circular saws, said cutter being of substantially the same width as said gap, means adapted to remove the stalk from each onion, means for lifting each onion vertically clear of the said onion retaining prongs and means for discharging the onions when trimmed.

3. An onion-trimming machine comprising a frame, a cylindrical body rotatable about a vertical axis in said frame, a pair of concentric annular rims rigid with said cylindrical body and defining an annular gap therebetween, groups of upwardly projecting prongs on the adjacent edges of either rim adapted to retain an onion spitted thereon by its base, at least one pair of circular saws mounted on a horizontal axis in said gap and at least one fixed cutter arranged above said gap substantially in a horizontal plane tangential to said circular saws, said cutter being substantially the same width as said gap, at least one horizontal circular saw above said gap mounted to rock about a horizontal axis, feeler means for controlling the inclination of said saw in accordance with the height of the onion, vertically clear of the said onion-retaining prongs and fixed means to discharge the onions once trimmed.

4. An onion-trimming machine as in claim 3 wherein the means to lift each onion and the means to discharge the onion comprise respectively at least one fixed ramp inside and above said gap having a maximum height exceeding that of said prongs, and at least one inclined chute adjacent said ramp having an oblique wall extending across said gap.

ADRIEN LUCIEN DUFOUR.

References Cited in the file of this patent

UNITED STATES PATENTS

| Number | Name | Date |
|---|---|---|
| 1,366,997 | Wyckoff | Feb. 1, 1921 |
| 1,640,745 | Ayars | Aug. 30, 1927 |
| 1,825,629 | Floyd | Sept. 29, 1931 |
| 1,886,388 | Gardner | Nov. 8, 1932 |
| 1,995,694 | Urschel | Mar. 26, 1935 |
| 2,184,889 | Schneider | Dec. 26, 1939 |
| 2,494,914 | Urschel et al. | Jan. 17, 1950 |